(12) United States Patent
Stuart et al.

(10) Patent No.: US 9,200,720 B2
(45) Date of Patent: Dec. 1, 2015

(54) VARIABLE FLOW VALVE

(71) Applicant: American Axle & Manufacturing, Inc., Detroit, MI (US)

(72) Inventors: Charles G. Stuart, Rochester Hills, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 161 days.

(21) Appl. No.: 14/153,175

(22) Filed: Jan. 13, 2014

(65) Prior Publication Data

US 2015/0198262 A1 Jul. 16, 2015

(51) Int. Cl.
  *F16K 31/02* (2006.01)
  *F16K 31/06* (2006.01)
  *F16K 1/14* (2006.01)
  *B23P 15/00* (2006.01)

(52) U.S. Cl.
  CPC ............ *F16K 31/0665* (2013.01); *B23P 15/001* (2013.01); *F16K 1/14* (2013.01)

(58) Field of Classification Search
  CPC ... F16K 31/0665; F16K 1/14; F16K 31/0655; F16K 1/42; B23P 15/001
  USPC ..................... 251/129.15, 360, 363
  See application file for complete search history.

(56) References Cited

U.S. PATENT DOCUMENTS

| | | | |
|---|---|---|---|
| 2,853,264 A * | 9/1958 | Lodge ............................ | 251/76 |
| 3,245,652 A | 4/1966 | Roth | |
| 3,661,183 A | 5/1972 | Komaroff et al. | |
| 3,833,015 A | 9/1974 | Kneuer | |
| 4,711,269 A | 12/1987 | Sule | |
| 4,756,331 A | 7/1988 | Stegmaier | |
| 4,981,281 A * | 1/1991 | Brundage et al. .......... | 251/30.02 |
| 4,997,004 A | 3/1991 | Barkhimer | |
| 5,143,345 A | 9/1992 | Miki et al. | |
| 5,227,400 A | 7/1993 | Holton et al. | |
| 5,423,347 A * | 6/1995 | Weber ........................ | 137/454.5 |
| 5,669,406 A | 9/1997 | Gluf, Jr. | |
| 5,785,297 A * | 7/1998 | Ha ........................... | 251/129.14 |
| 5,848,780 A | 12/1998 | Miller et al. | |
| 6,086,042 A * | 7/2000 | Scott et al. ............... | 251/129.15 |
| 2011/0001071 A1* | 1/2011 | Neumair et al. ......... | 251/129.15 |

FOREIGN PATENT DOCUMENTS

RU  2190142 C2  9/2002

* cited by examiner

*Primary Examiner* — John Bastianelli
(74) *Attorney, Agent, or Firm* — Harness, Dickey & Pierce, P.L.C.

(57) ABSTRACT

A variable flow valve having an externally threaded valve body, a valve element and an actuator that includes coil and a plunger assembly. The coil can be operated to move the plunger assembly to drive the valve element into engagement with a seat surface on a valve seat in the valve body.

12 Claims, 1 Drawing Sheet

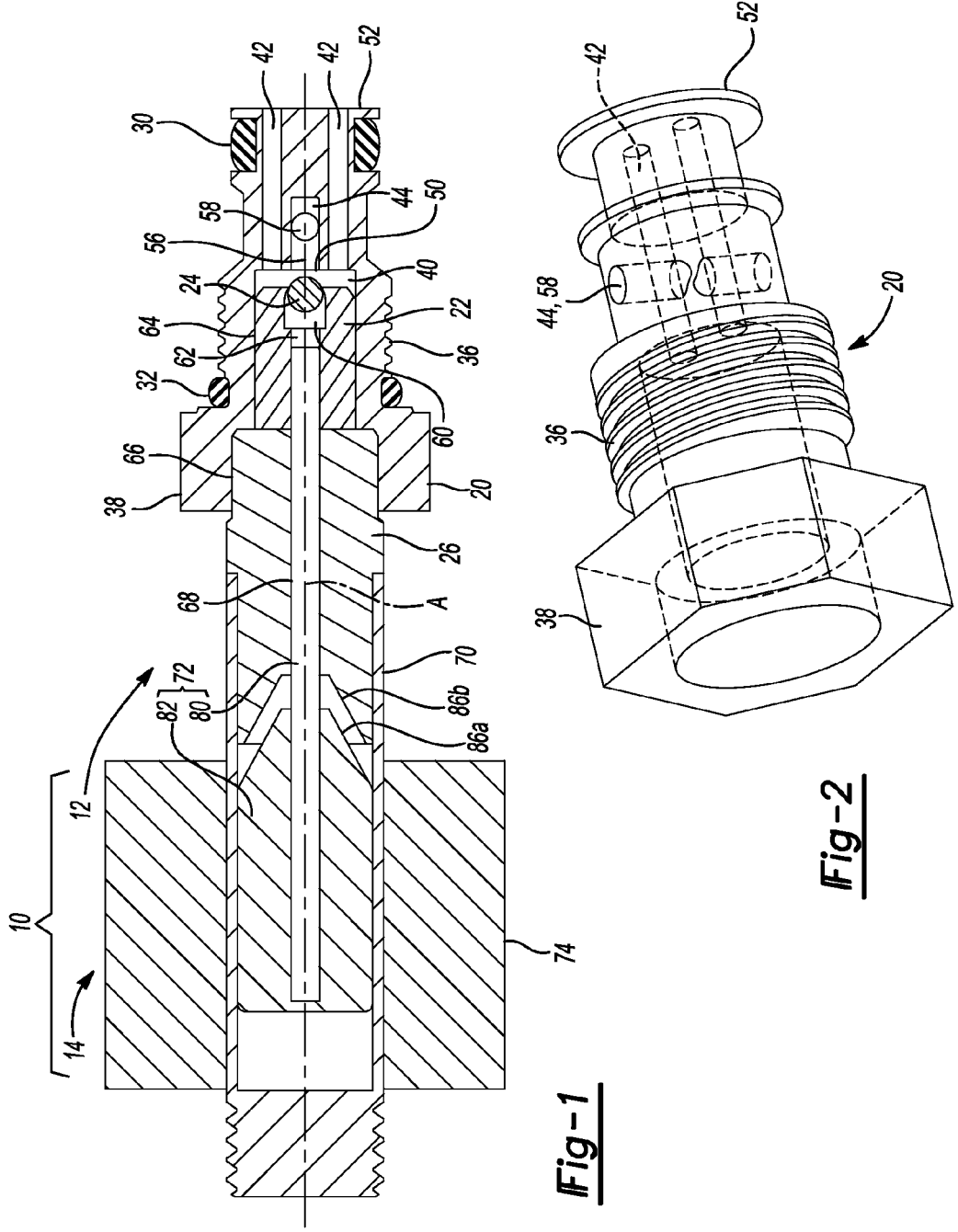

VARIABLE FLOW VALVE

FIELD

The present disclosure relates to a variable flow valve and an associated method for forming a variable flow valve.

BACKGROUND

This section provides background information related to the present disclosure which is not necessarily prior art.

U.S. Pat. No. 3,833,015 discloses an electromagnetic valve having a spherical valve element that is fixed to a plunger and movable in a fluid flow path. U.S. Pat. No. 4,756,331 discloses an electromagnetic valve in which a plunger is employed to selectively move a ball element to close the valve. While such valves are satisfactory for their intended purposes, there remains a need in the art for an improved electromagnetic valve that can be operated as a variable flow valve.

SUMMARY

This section provides a general summary of the disclosure, and is not a comprehensive disclosure of its full scope or all of its features.

In one form, the present teachings provide a variable flow valve that includes a valve body assembly and an actuator. The valve body assembly has a valve body, a valve element guide, a valve element, a valve actuator guide, a first seal and a second seal. The valve body has an externally threaded section, a valve element chamber, an outlet port, and an inlet port. The valve element chamber defines a valve seat. The outlet port is formed through a first axial end of the valve body and intersects the valve chamber radially outwardly of the valve seat. The inlet port has a first portion, which intersects the valve seat, and second portion that is in fluid communication with the first portion and which extends transverse to a longitudinal axis of the valve body. The valve element guide is received in the valve element chamber and defines a valve element channel and a rod channel that are coincident with the longitudinal axis of the valve body. The valve element is received in the valve element channel and is movable along the longitudinal axis between a first position, in which the valve element is abutted against the valve seat, and a second position in which the valve element is spaced apart from the valve seat by a predetermined distance. The valve actuator guide is received into the valve body and is abutted against the valve element guide. The valve actuator guide defines a guide bore that is coincident with the longitudinal axis. The first seal is received on and is sealingly engaged to the valve body in a first seal location that is axially between the second portion of the inlet port and the first axial end of the valve body. The second seal is received on and is sealingly engaged to the valve body in a second seal location that is axially spaced apart from the second portion of the inlet port such that the inlet port is disposed axially between the first and second seals. The actuator has a cover, a plunger assembly and a coil. The cover is disposed about the plunger assembly and is fixedly coupled to the valve body. The plunger assembly includes a rod, which is received through the rod channel and the guide bore, and an armature that is coupled to the rod. The plunger assembly is movable in the cover along the longitudinal axis to move the valve element from the second position to the first position. The coil is disposed about the cover and is configured to generate a magnetic field to move the armature.

In another form, the present teachings provide a method for forming a variable flow valve. The method includes: providing a valve body having an externally threaded section, a valve element chamber, an outlet port, and an inlet port, the valve element chamber defining a valve seat, the outlet port being formed through a first axial end of the valve body and intersecting the valve chamber radially outwardly of the valve seat, the inlet port having a first portion, which intersects the valve seat, and second portion that is in fluid communication with the first portion and which extends transverse to a longitudinal axis of the valve body; providing a valve element guide that defines a valve element channel and a rod channel; installing a valve element to the valve element channel in the valve element guide; installing the valve element guide in the valve element chamber such that the valve element is movable along the longitudinal axis between a first position, in which the valve element is abutted against the valve seat, and a second position in which the valve element is spaced apart from the valve seat by a predetermined distance; installing a valve actuator guide into the valve body and in abutment with the valve element guide, the valve actuator guide including a guide bore formed therethrough coincident with the longitudinal axis; providing a plunger assembly having a rod and an armature; positioning the rod through the guide bore and the rod channel such that the rod is abutted against the valve element and the valve element is abutted against the valve seat; moving the armature on the rod such that a first surface on the armature is spaced apart from a second surface on the valve actuator guide by a predetermined distance; and securing the rod to the armature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal cross-section view of a variable flow valve constructed in accordance with the teachings of the present disclosure; and FIG. 2 is a perspective view of a portion of the variable flow valve of FIG. 1 illustrating a valve body in more detail.

Corresponding reference numerals indicate corresponding parts throughout the several views of the drawings.

DETAILED DESCRIPTION

With reference to FIG. 1, a variable flow valve constructed in accordance with the present teachings is generally indicated by reference numeral 10. The variable flow valve 10 can include a valve body assembly 12 and an actuator 14.

In FIGS. 1 and 2, the valve body assembly 12 can comprise a valve body 20, a valve element guide 22, a valve element 24, an actuator guide 26, a first seal 30 and a second seal 32. The valve body 20 can have an externally threaded section 36, a tool engaging surface 38, a valve element chamber 40, at least one outlet port 42, and an inlet port 44. The externally threaded section 36 can be sized to permit the variable flow valve 10 to be threaded into a housing (not shown) that defines a portion of a hydraulic circuit (not shown). The tool engaging surface 38 can be configured to be gripped by a tool (not shown) to tighten the variable flow valve 10 into the housing.

The tool engaging surface 38 can have a non-round cross-sectional shape that can be shaped in any desired manner, such as a polygon. In the particular example provided, the non-round cross-sectional shape of the tool engaging surface 38 is a hexagon.

The valve element chamber 40 can define a valve seat 50 that can be shaped in a desired manner. In the example provided, the valve seat 50 has a seat surface that is defined by a spherical radius, but it will be appreciated that other shapes, including a conical shape, could be employed in lieu of a spherical radius. The outlet port 42 can be formed through a first axial end 52 of the valve body 20 and can intersect the valve element chamber 40 radially outwardly of the valve seat 50. In the example provided, two outlet ports 42 are provided. The inlet port 44 can have a first portion 56, which can intersects the valve seat 50 and be disposed coincident with a longitudinal axis A of the valve body 20, and second portion 58 that is in fluid communication with the first portion 56 and which can extend transverse to the longitudinal axis A. In the example provided, the inlet port 44 is formed perpendicular to the longitudinal axis A.

The valve element guide 22 can be received in the valve element chamber 40 and can define a valve element channel 60 and a rod channel 62 that are coincident with the longitudinal axis A of the valve body 20. In the example provided, the valve element guide 22 is a generally hollow cylindrical element that is received in a first counterbore 64 formed in the valve body 20.

The valve element 24 can be received in the valve element channel 60 and can be movable along the longitudinal axis A between a first position, in which the valve element 24 is abutted against the valve seat 50, and a second position in which the valve element 24 is spaced apart from the valve seat 50 by a predetermined distance. The valve element 24 can be shaped in a matter that corresponds to the seat surface of the valve seat 50. In the particular example provided, the valve element 24 is a spherical ball.

The actuator guide 26 can be received into the valve body 20 and abutted against the valve element guide 22. In the example provided, the actuator guide 26 is received into a second counterbore 66 formed in the valve body 20. The actuator guide 26 can define a guide bore 68 that can be formed through the actuator guide 26 coincident with the longitudinal axis A.

The first seal 30 can be received on and sealingly engaged to the valve body 20 in a first seal location that is located axially (i.e., along the longitudinal axis A) between the second portion 58 of the inlet port 44 and the first axial end 52 of the valve body 20. The second seal 32 can be received on and sealingly engaged to the valve body 20 in a second seal location that is axially spaced apart (i.e., along the longitudinal axis A) from the second portion 58 of the inlet port 44 such that the inlet port 44 is disposed axially between the first and second seals 30 and 32. The second seal 32 can be positioned such that the externally threaded section 36 is disposed axially between the second seal 32 and the second portion 58 of the inlet port 44.

The actuator 14 can have a cover 70, a plunger assembly 72 and a coil 74. The cover 70 can be disposed about the plunger assembly 72 and can be fixedly coupled to the actuator guide 26. The plunger assembly 72 can comprise a rod 80, which can be received through the rod channel 62 and the guide bore 68, and an armature 82 that can be coupled to the rod 80. The plunger assembly 72 is movable in the cover 70 along the longitudinal axis A to move the valve element 24 from the second position to the first position. The coil 74 is disposed about the cover 70 and is configured to generate a magnetic field (when the coil 74 is powered by a source of electrical power) to move the armature 82.

In operation, fluid flow can be introduced to the variable flow valve 10 via the inlet port 44, which can urge the valve element away from the valve seat 50. The fluid flow can enter the valve element chamber 40, flow past the valve element 24 and through the outlet port 42. Depending on the maximum extent to which the valve element 24 can be spaced apart from the valve seat 50, there may be little restriction (i.e., in a situation where the maximum extent or spacing between valve element 24 and the seat surface of the valve seat 50 is relatively large) or a relatively large restriction (i.e., in a situation where the maximum extent or spacing between valve element 24 and the seat surface of the valve seat 50 is relatively small). The variable flow valve 10 can be closed by providing electrical power to the coil 74 that causes the plunger assembly 72 to move along the longitudinal axis A to drive the valve element 24 into contact with the seat surface of the valve seat 50 and maintain the valve element 24 in this position (i.e., the first position). In situations where a flow rate that is intermediate the above-two described flow rates is desired, electrical power can be supplied to the coil 74 in a manner that either varies the force that is applied by the plunger assembly 72 onto the valve element 24 or which cycles the valve element 24 between its first and second positions at a desired duty cycle. Variation of the force that is applied by the plunger assembly 72 onto the valve element 24 could be achieved through a corresponding change in the voltage that is applied to the coil 74 or through use of a pulse-width modulation technique. The adjacent ends of the armature 82 and the actuator guide 26 can be shaped in a desired manner to tailor the holding force that is generated (magnetically) when the coil 74 is operated. For example, the adjacent ends 86a and 86b of the armature 82 and the actuator guide 26 can be formed with corresponding conical surfaces. Stated another way, one of the adjacent ends 86a and 86b can have a male frusto-conical shape and the other one of the adjacent ends 86a and 86b can have a female frusto-conically shaped bore that corresponds to the male frusto-conical shape.

The variable flow valve 10 can function as a normally open valve in which electrical power is not provided to the coil 74 and fluid flow entering the variable flow valve 10 via the inlet port 44 can urge the valve element 24 away from the valve seat 50 and exit through the outlet port 42. Alternatively, flow could be reversed (such that fluid flow is introduced to the variable flow valve 10 via the outlet port 42 and exits via the inlet port 44), which would tend to restrict flow as the flow of fluid through the variable flow valve 10 would tend to move the valve element 24 against the valve seat 50. When used in hydraulic circuits that operate at relatively low pressure (i.e., <500 psi), the valve body assembly 12 does not require extremely tight tolerances and as such, its construction is simplified and its cost reduced as compared with conventional variable flow valves. Moreover, it will be appreciated that the effective length of the plunger assembly 72, along with the diameter of the inlet and inlet ports 42 and 44 can be varied to tailor the flow restriction and the pressure drop through the variable flow valve 10.

A method for forming the variable flow valve 10 can include: providing a valve body having an externally threaded section, a valve element chamber, an outlet port, and an inlet port, the valve element chamber defining a valve seat, the outlet port being formed through a first axial end of the valve body and intersecting the valve chamber radially outwardly of the valve seat, the inlet port having a first portion, which intersects the valve seat, and second portion that is in fluid communication with the first portion and which extends transverse to a longitudinal axis of the valve body; providing a valve element guide that defines a valve element channel and a rod channel; installing a valve element to the valve element channel in the valve element guide; installing the valve element guide in the valve element chamber such that the valve element is movable along the longitudinal axis between a first position, in which the valve element is abutted against the valve seat, and a second position in which the valve element is spaced apart from the valve seat by a predetermined distance; installing a valve actuator guide into the valve body and in abutment with the valve element guide, the valve actuator guide including a guide bore formed therethrough coincident with the longitudinal axis; providing a plunger assembly having a rod and an armature; positioning the rod through the guide bore and the rod channel such that the rod is abutted against the valve element and the valve element is abutted against the valve seat; moving the armature on the rod such that a first surface on the armature is spaced apart from a second surface on the valve actuator guide by a predetermined distance; and securing the rod to the armature.

The method can optionally include press-fitting the rod to the armature; bonding the rod to the armature; installing a cover to the valve actuator guide, the cover defining a cavity into which the armature is received; and/or coupling a coil to the cover.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a variable flow valve comprising:
providing a valve body having an externally threaded section, a valve element chamber, an outlet port, and an inlet port, the valve element chamber defining a valve seat, the outlet port being formed through a first axial end of the valve body and intersecting the valve chamber radially outwardly of the valve seat, the inlet port having a first portion, which intersects the valve seat, and second portion that is in fluid communication with the first portion and which extends transverse to a longitudinal axis of the valve body;
providing a valve element guide that defines a valve element channel and a rod channel;
installing a valve element to the valve element channel in the valve element guide;
installing the valve element guide in the valve element chamber such that the valve element is movable along the longitudinal axis between a first position, in which the valve element is abutted against the valve seat, and a second position in which the valve element is spaced apart from the valve seat by a predetermined distance;
installing a valve actuator guide into the valve body and in abutment with the valve element guide, the valve actuator guide including a guide bore formed therethrough coincident with the longitudinal axis;
providing a plunger assembly having a rod and an armature;
positioning the rod through the guide bore and the rod channel such that the rod is abutted against the valve element and the valve element is abutted against the valve seat;
moving the armature on the rod such that a first surface on the armature is spaced apart from a second surface on the valve actuator guide by a predetermined distance; and
securing the rod to the armature.

2. The method of claim 1, wherein the rod is press-fit to the armature.

3. The method of claim 1, further comprising bonding the rod to the armature.

4. The method of claim 1, further comprising installing a cover to the valve actuator guide, the cover defining a cavity into which the armature is received.

5. The method of claim 4, further comprising coupling a coil to the cover.

6. A variable flow valve comprising:
a valve body assembly having a valve body, a valve element guide, a valve element, a valve actuator guide, a first seal and a second seal, the valve body having an externally threaded section, a valve element chamber, an outlet port, and an inlet port, the valve element chamber defining a valve seat, the outlet port being formed through a first axial end of the valve body and intersecting the valve chamber radially outwardly of the valve seat, the inlet port having a first portion, which intersects the valve seat, and second portion that is in fluid communication with the first portion and which extends transverse to a longitudinal axis of the valve body, the valve element guide being received in the valve element chamber and defining a valve element channel and a rod channel that are coincident with the longitudinal axis of the valve body, the valve element being received in the valve element channel and being movable along the longitudinal axis between a first position, in which the valve element is abutted against the valve seat, and a second position in which the valve element is spaced apart from the valve seat by a predetermined distance, the valve actuator guide being received into the valve body and abutted against the valve element guide, the valve actuator guide including a guide bore formed therethrough coincident with the longitudinal axis, the first seal being received on and sealingly engaged to the valve body in a first seal location that is axially between the second portion of the inlet port and the first axial end of the valve body, the second seal being received on and sealingly engaged to the valve body in a second seal location that is axially spaced apart from the second portion of the inlet port such that the inlet port is disposed axially between the first and second seals; and
an actuator having a cover, a plunger assembly and a coil, the cover being disposed about the plunger assembly and being fixedly coupled to the valve body, the plunger assembly comprising a rod, which is received through the rod channel and the guide bore, and an armature that is coupled to the rod, the plunger assembly being movable in the cover along the longitudinal axis to move the valve element from the second position to the first position, the coil being disposed about the cover and being configured to generate a magnetic field to move the armature.

7. The variable flow valve of claim 1, wherein the valve element is a spherical ball.

8. The variable flow valve of claim 1, wherein the second portion of the inlet port is formed perpendicular to the longitudinal axis.

9. The variable flow valve of claim 1, wherein the externally threaded section is disposed axially between the second seal and the second portion of the inlet port.

10. The variable flow valve of claim 1, wherein the valve body defines a tool engaging surface having a non-round cross-sectional shape.

11. The variable flow valve of claim 10, wherein the non-round cross-sectional shape of the tool engaging surface is a polygon.

12. The variable flow valve of claim 1, wherein adjacent ends of the armature and the valve actuator guide have corresponding conical surfaces.

\* \* \* \* \*

UNITED STATES PATENT AND TRADEMARK OFFICE
CERTIFICATE OF CORRECTION

| | | |
|---|---|---|
| PATENT NO. | : 9,200,720 B2 | Page 1 of 1 |
| APPLICATION NO. | : 14/153175 | |
| DATED | : December 1, 2015 | |
| INVENTOR(S) | : Charles G. Stuart et al. | |

It is certified that error appears in the above-identified patent and that said Letters Patent is hereby corrected as shown below:

Claims,

| | | |
|---|---|---|
| Column 6, Claim 7 | Line 63 | Delete "claim 1" and insert --claim 6--, therefor |
| Column 6, Claim 8 | Line 65 | Delete "claim 1" and insert --claim 6--, therefor |
| Column 7, Claim 9 | Line 1 | Delete "claim 1" and insert --claim 6--, therefor |
| Column 7, Claim 10 | Line 4 | Delete "claim 1" and insert --claim 6--, therefor |
| Column 7, Claim 12 | Line 10 | Delete "claim 1" and insert --claim 6--, therefor |

Signed and Sealed this
Eighth Day of March, 2016

Michelle K. Lee
*Director of the United States Patent and Trademark Office*